Feb. 14, 1967   A. D'ONOFRIO   3,303,694
LOAD MEASURING SYSTEM
Filed March 19, 1964   4 Sheets-Sheet 3

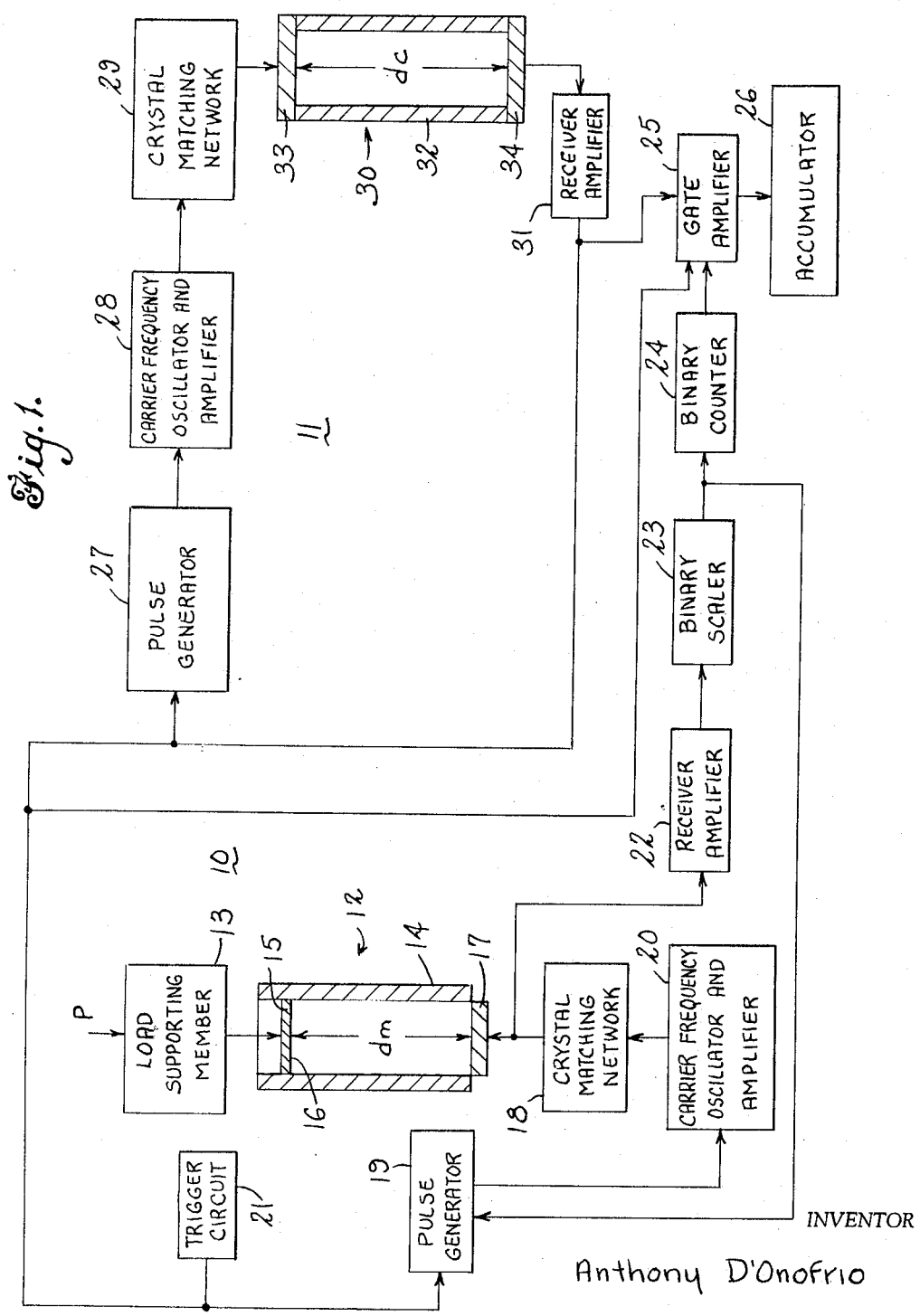

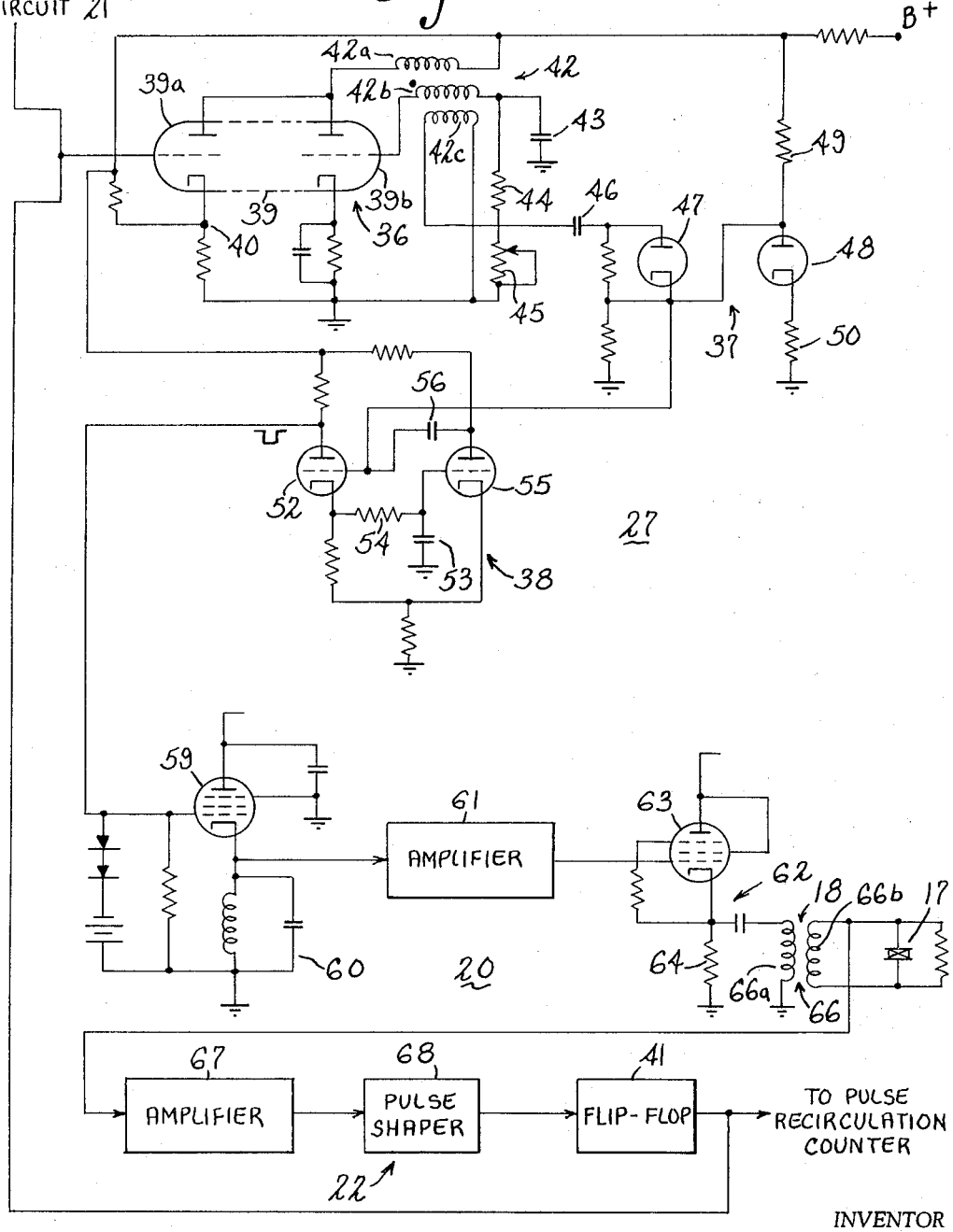

INVENTOR
Anthony D'Onofrio
BY
Rockwell and DeLio
ATTORNEYS

Feb. 14, 1967  A. D'ONOFRIO  3,303,694
LOAD MEASURING SYSTEM
Filed March 19, 1964  4 Sheets-Sheet 4

INVENTOR
Anthony D'Onofrio
BY Rockwell and De Lio
ATTORNEYS

United States Patent Office 3,303,694
Patented Feb. 14, 1967

3,303,694
LOAD MEASURING SYSTEM
Anthony D'Onofrio, West Hartford, Conn., assignor, by mesne assignments, to Fairbanks Morse Inc., New York, N.Y., a corporation of Delaware
Filed Mar. 19, 1964, Ser. No. 353,065
5 Claims. (Cl. 73—141)

This invention relates to transducing apparatus for measuring a physical property in terms of other parameters and more particularly relates to apparatus for precisely measuring a load in terms of time.

The present invention provides a load cell which is affected by a load applied thereto in such manner as to provide a signal having a parameter proportional to deflection or distance of movement of a load receiving member. In the present invention a load cell transducer is utilized which measures a physical characteristic in terms of uniform intervals of time, and provides fast and extremely accurate measurements. The invention provides a weighing system wherein the indication of the load is directly read out in digital form. This increases the overall security of the system and reduces system susceptibility to errors produced by variations such as line voltage. The invention further provides a load cell having a wide usable range, and which is highly responsive to load variations.

Accordingly, an object of this invention is to provide a new and improved system for measuring a load or force.

Another object of this invention is to provide a new and improved weighing system.

Another object of this invention is to provide a new and improved weighing system which accurately measures deflection in terms of time.

Another object of this invention is to provide a weighing system utilizing a new and improved load cell whose accuracy is not affected by temperature variations.

A further object of this invention is to provide a load cell transducer which accurately measures deflection of a member in terms of precise intervals of time.

A still further object of this invention is to provide a load cell transducer and measuring system providing an output indication which is extremely linear with respect to an input stimulus.

Briefly stated, the invention in one form thereof, comprises a chamber containing a wave propagation medium. An electro-acoustic crystal and a wave reflecting interface are oppositely disposed in the chamber. One of the crystals or interface is movable with respect to the other in response to an applied load. The crystal is pulse-excited and transmits a mechanical wave toward the interface. The time required for the wave to be reflected from the interface to the crystal and mechanically stress the crystal, and produce an electrical output from the crystal is a measure of the distance between the crystal and the interface. The electrical output of the crystal causes the crystal to again be pulse-excited, thus creating a pulse recirculation cycle. By measuring the time for completion of a predetermined number of recirculation cycles a precise measure of the displacement of the interface with respect to the crystal is obtained.

The novel features of the invention are pointed out with particularity, and distinctly claimed in the concluding portion of this specification. However, the invention, both as to its operation and organization, together with further objects and advantages thereof, may best be appreciated by reference to the following detailed description taken in conjunction with the drawings in which:

FIG. 1 is a diagram in block form of a load measuring system embodying the invention;

FIG. 2 is a diagram partly schematic and partly in block form of a portion of the system shown in FIG. 1;

Figure 7:
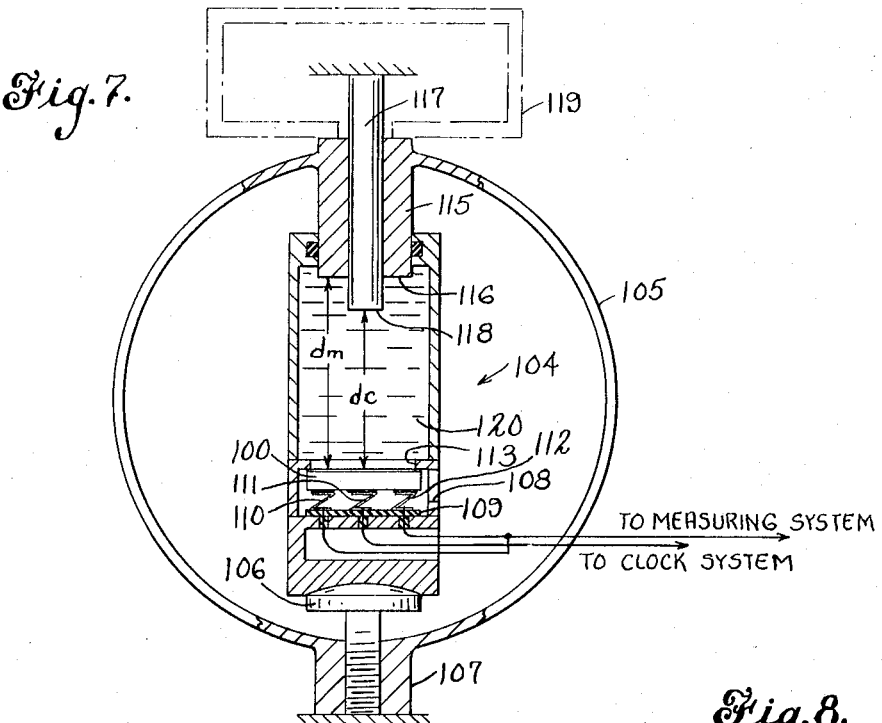
FIG. 7 is a view, partly in section, of a transducer, embodying both a measuring system and a timing system which may be utilized in the system of FIG. 1 in place of the transducers of FIGS. 4, 5 and 6.

The invention in a preferred form thereof generally comprises a measuring section 10 and means for providing timing pulses at uniform intervals, here designated a clock section 11. The function of the measuring section is to accept a load and provide signals characteristically indicative of a load or force to be measured. The function of the clock system is to provide a series of pulses at uniform time intervals. The clock system 11 as hereinafter disclosed, also provides temperature compensation for the measuring system. The measuring section 10 generally comprises a load cell transducer system 12 which in turn comprises a load supporting member 13 adapted to receive a load represented by the vector P, and a transducing chamber 14. The transducing chamber 14 is filled with a medium which is effective to propagate a mechanical wave therethrough and has at one end thereof a member 15 providing an interface 16. At the other end thereof is a mechanical-to-electrical transducer in the form of a piezoelectric crystal 17.

A load may be applied to the interface providing member 15 through load supporting member 13, or a member supporting the crystal to vary the difference $d_m$ therebetween. The distance $d_m$ is a function of a load exerted on member 15.

When the crystal is pulsed with electrical energy it will produce waves through the propagation medium to the interface which waves will be reflected to the crystal and mechanically stress the crystal. When mechanically stressed by a reflected wave the crystal will produce an electrical signal at its natural frequency. It is well known that if an alternating voltage is applied across a crystal, the crystal will vibrate, and if the alternating voltage approximates a frequency at which mechanical resonance can exist in the crystal, the amplitude of vibrations will be very large. Similarly, if the crystal is mechanically stressed, it will produce electrical signals in response thereto.

Where the propagation medium is known, the time required for a pulse to travel from the crystal 17 to the interface 16 and return, is a measure of the distance between the crystal 17 and interface 16 and also a measurement of the displacement of the interface relative to the crystal. Crystal 17 receives a burst or pulse of alternating energy at the natural frequency of the crystal through a crystal-matching network 18, which receives electrical pulses from a pulse generator 19 and a carrier frequency oscillator and amplifier 20. The pulse generator is initially triggered externally from a trigger circuit 21, as will hereinafter be described, but thereafter is triggered when a reflected wave from interface 16 produces an electrical output from crystal 17. When a reflected wave from interface 16 strikes crystal 17, crystal 17 generates an alternating voltage at its natural frequency.

The burst of electrical energy or electrical pulse output of crystal 17 which occurs when a reflected wave is received from interface 16 is applied to a receiver amplifier 22, hence amplified and shaped into a pulse and applied to a binary scaler 23 which in the preferred form comprises a bi-stable device which changes its state each time a pulse is received. The bi-stable device comprising binary scaler 23 applies a pulse to a binary counter 24 for each two pulses received from receiver amplifier 22. Counter 24 counts the pulse output of binary scaler 23 and when a predetermined number of pulses have been received counter 24 applies an inhibiting signal to gate amplifier 25. The pulse output of binary scaler 23 is also utilized to trigger pulse generator 19 and commence another cycle of operation. In effect, a pulse recirculation loop is established. The pulse output of receiver amplifier 22 produces a pulse output from binary scaler 23, which in turn triggers pulse generator 19 to commence a new recirculation cycle.

So long as gate amplifier 25 is not inhibited it allows the pulse output of clock system 11 to be applied to an accumulator 26 which in a preferred form comprises a binary down counter. Clock system 11 supplies pulses at uniform intervals of time to accumulator 26 through gate amplifier 25.

As thus far described it may be seen that the measuring system will produce a predetermined number of output pulses in a time which is determined by the distance $d_m$ between crystal 17 and interface 16. This in turn depends upon the time or propagation of a wave from crystal 17 to interface 16 and return to crystal 17. It is quite apparent that the time between the crystal 17 receiving an electrical pulse from pulse generator 19 and the crystal 17 applying an electrical pulse to receiver amplifier 22 is a measure of the distance $d_m$. Therefore, when counter 24 is set to count a predetermined number of pulses it will enable gate amplifier 25 to pass pulses from the clock system for a predetermined interval of time. Gate amplifier 25 is initially enabled by the starting pulse from trigger circuit 21.

Clock system 11 generally comprises a pulse generator 27 which is initially externally triggered, a carrier frequency oscillator and amplifier 28, a crystal matching network 29, a transducing system 30 and a receiver amplifier 31. Transducing system 30 comprises a chamber 32 filled with the same propagation medium as chamber 14 and crystal transducers 33 and 34 at either end thereof. The distance $d_c$ between crystals 33 and 34 is always constant. Therefore, the time of propagation of a wave therethrough is always constant, except under conditions hereinafter described. At this point it may be assumed when the clock system is operated it will produce a pulse output at a constant repetition rate.

When gate amplifier 25 is enabled, it will pass pulses from receiver amplifier 31 to accumulator 26. When binary counter 24 has received a predetermined number of pulses from binary scaler 23, it inhibits gate amplifier 25. Accumulator 26 is preferably a down counter, and the number of pulses counted thereby before counter 24 inhibits gate amplifier 25 is a measure of the time required for counter 24 to receive a predetermined number of pulse counts from scaler 23.

The invention may best be understood by consideration of a mathematical explanation of the illustrated system.

The frequency $f_c$ of clock system 11 may be expressed as $$f_c = \frac{V_p}{d_c} \qquad (1)$$

where $V_p$ is the velocity of propagation of a wave through the propagation medium.

The total time delay $t_d$ in measuring system 10 is $$t_d = m\frac{d_m}{V_p} \qquad (2)$$

where $m$ is the number of pulse recirculations. Since $t_d$ may be expressed in terms of $f_c$ as $$t_d = \frac{md_m}{f_c d_c} \qquad (3)$$

then the number of pulses $n$ in accumulator 26 is $$n = \frac{md_m}{d_c} \qquad (4)$$

From the foregoing it may be seen that the count into accumulator 26 depends only on the number of pulse recirculations, the distance $d_m$ being measured, and the constant distance $d_c$ between the crystals of the clock system. The number of recirculations, of course, is the number of times that binary scaler 23 is reset, which in turn indicates the number of pulses produced by crystal 17.

Inasmuch as the transducer configuration yields a digital type read out, the system disclosed may be integrated with a data processing system and can provide an extremely fast, precise and accurate weighing system.

Figure 5:
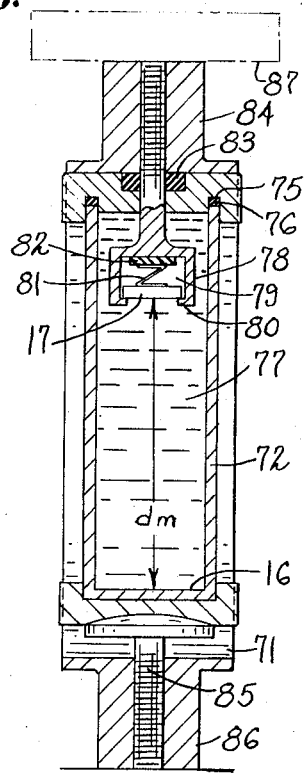
FIG. 5 is a view seen along section 5—5 of FIG. 4.

The electrical portion of FIG. 1 will first be explained. Pulse generator 19 is schematically illustrated in FIG. 5. FIG. 5 is also exemplary of pulse generator 27 inasmuch as the pulse generators 19 and 27 may be identically constructed. Pulse generator 27 comprises a triggered blocking oscillator 36, a rectifier and clamp 37 and a pulse shaping network 38. As illustrated, blocking oscillator 36 comprises a dual triode 39 having a first half 39a utilized as a trigger and a second half 39b utilized as the oscillator.

Tube section 39a is normally conducting and the potential at the plate thereof is essentially the same as the potential at point 40. By virtue of the common connection of the plates of tube sections 39a and 39b the plate of tube section 39b will be at a potential which does not support conduction of tube half 39b.

If now a negative-going pulse is applied to the grid of tube section 39a from either trigger circuit 21 or flip-flop 41 which cuts off tube half 39a the potential at the plate of tube 39b will commence to rise toward the supply voltage B+.

Blocking oscillator 36 includes a transformer 42 having windings 42a, 42b and 42c. The grid circuit of tube half 39b comprises a grid capacitor 43 and grid resistances 44 and 45. The resonant frequency of the oscillator, as is well known to those skilled in the art, is determined by the inductance of the transformer windings and the capacitance supplied by the distributed capacitance of the windings, and inter-electrode capacitance of the tube. The coupling of the windings is very close and the turns ratio is such that the grid drive is exceptionally large compared with that ordinarily used in oscillator operation.

When the voltage at the plate of tube section 39b rises, by transformer action, the voltage induced in winding 57b rises, driving the grid positive and thus increasing the plate current. This is a regenerative action which continues until the grid draws current, thus charging capacitor 43. The charging of capacitor 43 ceases when the plate potential falls so low that the plate circuit can no longer drive the low impedance reflected from the grid circuit. At this time tube section 39b ceases to conduct.

Because of the large ratio of inductance to capacitance of the resonant circuit, the tight coupling of the windings, and the high ratio of alternating grid to alternating plate voltage, the oscillations build-up in the first quarter cycle to an amplitude such that the alternating-plate cathode voltage is only slightly less than the plate-supply voltage. At the same time, the high grid drive causes capacitor 43 to charge up to a high voltage during this quarter cycle. Then at the end of the first half cycle, when the instantaneous voltage across the windings is zero, the tube is biased to many times the grid cut-off bias. The positive peak of the next cycle of operation will not be of sufficient amplitude to bring the instantaneous grid potential above cut-off and oscillations die out. Upon completion of the duration of the triggering pulse tube section 39a will conduct and the plate of tube section 39b will be held at the potential of point 40. As the charge on capacitor 43 leaks off through resistors 44 and 45, the grid potential rises to a value which will allow conduction of tube section 39b. However, tube section 39b is held off by tube section 39a until a recirculating pulse from flip-flop 41 again cuts off tube section 39a.

When the voltage at the plate of tube section 39b suddenly starts to increase upon application of the trigger pulse to tube section 39a a large positive-going pulse is induced in winding 42c. This voltage is applied through a coupling capacitor 46 to a rectifier in the form of diode 47. Diode 47 will conduct only when the induced voltage in winding 42c exceeds a threshold value established by the clamping action of diode 48. Diode 48 together with resistances 49 and 50 establish a threshold voltage at the cathode of diode 47. The resulting pulse passed by diode 47 is applied to a normally conducting tube 52 of pulse shaping circuit 38. When a positive-going pulse is applied to the grid of tube 52 it is triggered into conduction and the plate voltage thereof falls. When tube 52 conducts, capacitor 53 charges through resistance 54 until the voltage thereon is of a sufficient value to trigger tube 55 into conduction. At that time the plate voltage of tube 55 suddenly decreases, which decrease is reflected to the grid of tube 52 through capacitor 56 thereby cutting off tube 52 and producing a negative-going pulse of predetermined width at the plate of tube 52. The duration or width of pulse P is determined by the time constant of resistance 54 and capacitor 53.

The pulse output of pulse generator 19 is applied to a carrier frequency oscillator and amplifier 20. The negative-going output pulse P of pulse shaping circuit 38 is applied to the grid of a normally conducting tube 59 which is cut off for the predetermined duration of the negative going pulse P. When tube 59 is turned off, the energy stored in tank circuit 60 in the cathode circuit thereof generates a burst of oscillations at the resonant frequency of tank circuit 60. The resonant frequency of tank circuit 60 is made the same as the natural frequency of crystal 17.

Pulse generator 27 keys the carrier frequency oscillator thus producing a burst of the carrier frequency which is coherent with the triggering pulse. This is accomplished by causing the oscillator to conduct fully, normally producing no oscillations. The trigger pulse P from the pulse generator cuts the oscillator tube off permitting the energy stored in the tank circuit to produce oscillations at the tank frequency. The phase and amplitude of the oscillation build-up are, therefore, the same for each trigger pulse. This coherence is important from the view of the overall system since the information is in the leading edge of the pulse P.

The burst of RF energy from tank circuit 60 is then passed through an amplifier 61 having an appropriate number of stages of amplification to a power amplifier 62 comprising a tube 63 in a cathode follower arrangement. The voltage appearing across cathode follower resistor 64 is applied to a series resonant circuit comprising a capacitor 65 and the primary winding 66a of matching transformer 66. The secondary winding 66b of transformer 66 has inclosed therein a stepped up voltage which is applied across crystal 17.

The alternating energy applied across crystal 17, creates electrical stresses therein causing crystal 17 to vibrate and propagate mechanical waves toward interface 16. At the same time the voltage appearing across winding 66b is applied to receiver amplifier 22. Receiver amplifier 22 actually provides two functions, amplification and pulse shaping. The voltage appearing across winding 66b is applied to amplifier 67 and pulse shaper 68 where the carrier frequency is filtered out and a pulse shaped. The shaped pulse is then applied to a flip-flop 41 to set it in a first of its two stable states.

Interface 16 reflects the mechanical wave from crystal 17 back toward crystal 17. When the reflected wave impinges on crystal 17 it creates a mechanical stress therein. This causes crystal 17 to produce oscillations at its resonant frequency. The signal generated by crystal 17 is then applied to receiver amplifier 22 and shaped into a pulse as previously explained. The shaped pulse is then applied to flip-flop 41 to reset it. When flip-flop 41 is reset it applies a pulse to pulse counter 24, and also to pulse generator 19.

This completes a pulse recirculation cycle. The initial or "call" pulse output of pulse generator 19 causes flip-flop 41 to be set, and the received pulse due to the reflected wave resets flip-flop 41. This results in flip-flop 41 applying a triggering pulse to tube section 39a of pulse generator 19. This generates another "call" pulse and the cycle is repeated. This will continue until the feedback loop from flip-flop 41 to pulse generator 19 is opened or blocked. The output pulse width of flip-flop 41 which is determined by the time interval between the call and received pulse represents the time for a wave to travel through the propagation medium from crystal 17 to interface 16 and return.

In accordance with the invention the number of pulse recirculations may be counted and controlled. Pulse counter 24, FIG. 1, counts the pulses from flip-flop 41, or the number of times the flip-flop comprising scaler 23 is reset. Sensing means, not shown, sense when a predetermined number of pulses have been received and in response thereto block or inhibit gate amplifier 25. Alternatively, gate amplifier 25 may be inhibited by the overflow pulse from counter 24, if it is allowed to count to capacity.

Clock system 11 utilizes the same components as measuring system 10, with the exception of transducing arrangement 30 which comprises a transmitting crystal 33 and a receiving crystal 34. When crystal 33 is pulsed it transmits a mechanical wave through the propagation medium in chamber 32 to crystal 34 which then generates electrical energy which in turn is shaped into a pulse by receiver amplifier 31. The pulse output of receiver amplifier 31 is applied to accumulator 26 through gate amplifier 25, and also utilized to trigger pulse generator 27 to initiate another recirculation cycle in clock system 11.

The system is initially activated by a pulse from trigger circuit 21 which simultaneously triggers pulse generators 19 and 27 and enables gate amplifier 25. Trigger circuit 21 may take any convenient form. For example, it may be a one-shot multivibrator, or the initial triggering pulse may be produced by rapidly discharging a charged capacitor. Similarly, receiver amplifiers 22 and 31 may take one of several forms known to those skilled in the art. For example, it may comprise an amplifier 67 which is driven to saturation to increase the slope of the sine wave radio frequency signal applied thereto and provide a clipped sine wave output, and a pulse shaper 68 such as a differentiating circuit which further increases the steepness of the leading edge of the clipped sine wave, together with a filter which removes the carrier frequency. It is the leading edge of the pulses out of receiver amplifier 22 which set and reset flip-flop 41.

Figure 3:
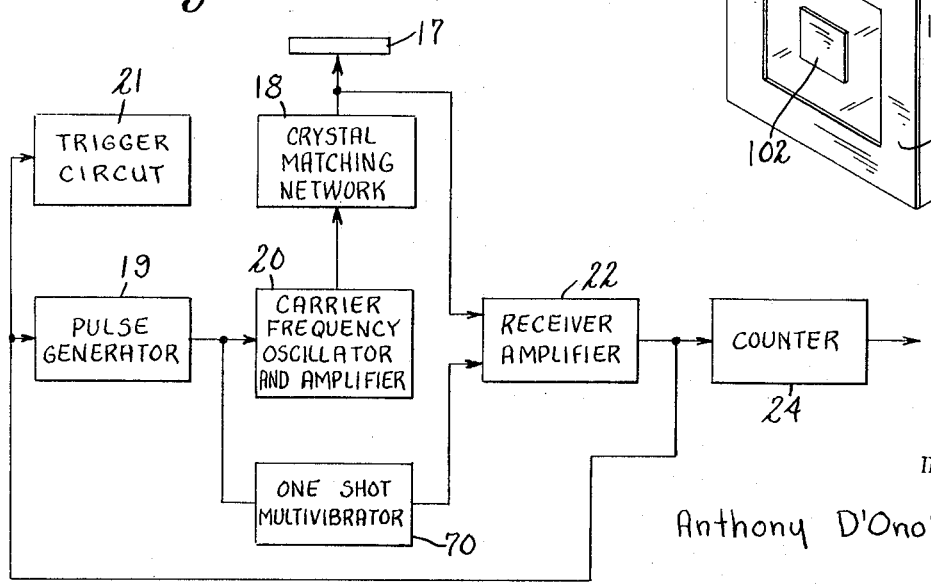
FIG. 3 is a diagram in block form of an alternate arrangement of a portion of FIG. 1.

An alternate embodiment of the measuring section 10 of the system is shown in FIG. 3. The elements of FIG. 3 which are the same as elements of FIG. 1 bear like reference numerals. The binary counter scaler 23 shown as a flip-flop (FIG. 2) is replaced by a one-shot multivibrator 70. The function of multivibrator 70 is to blank or block the input of receiver amplifier 22 when pulse generator 19 produces a pulse. The parameters of multivibrator 70 are so chosen that it shifts back to its stable state before a received pulse due to a reflected wave is received from crystal 17. However, the output signal from multivibrator 70, when in its unstable state, blocks the input of receiver amplifier 22 and receiver amplifier is insensitive to a "call" pulse. In the same manner as previously explained, an output pulse from receiver amplifier 22 is applied to counter 24, and also to pulse generator 19 to trigger another pulse recirculation cycle.

Figure 4:
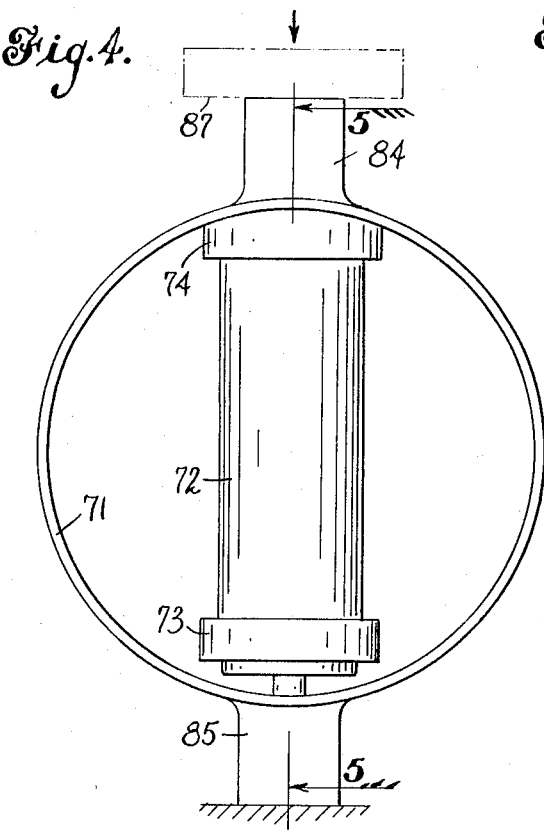
FIG. 4 is a view of a load cell transducer embodying the invention and used in the measuring section of FIG. 1.

Attention is now invited to FIGS. 4 and 5 which illustrate in detail the transducing system 12 of FIG. 1. Transducing system 12 is mounted within a proving ring 71 of conventional configuration, and comprises a wave propagating chamber 72. Wave propagating chamber 72 is mounted on a base member 73 and extends vertically therefrom to a cover and sealing member 74. The ends of propagating chamber 72 are received in an annular groove 75 defined in sealing member 74 which has a sealing ring 76 thereon. As will hereinafter be made apparent, chamber 72 is movable with respect to sealing member 74 in a vertical direction, as illustrated. Chamber 72 is filled with a suitable liquid medium 77, such as water or oil, which will propagate a mechanical wave therethrough. Extending to chamber 72 through sealing member 74 is a crystal supporting member 78. Member 78 has a crystal receiving recess 79 defined therein to receive crystal 17. The recess defining portion may be formed in two parts to facilitate insertion of crystal 17 therein. Crystal 17 is urged toward lips 80 by means of a contact spring 81 bearing on the face of the crystal and on an insulating disk 82 which provides means for electrically insulating the upper face of crystal 79 from the steel member 78 and the remaining structure of the transducing arrangement which is electrically grounded. No propagation medium is in recess 79. The spring contact is preferably of a material such as beryllium copper and an insulated conductor, not shown, extending through the stud portion of member 78 is electrically connected to contact spring 81. The bottom surface of chamber 72, which is of steel, provides reflecting interface 16. Member 78 extends through sealing member 74 and a seal 83, and is threadably received in and supported by a boss 84 on proving ring 71. Base member 73 is supported on a stud 85 threadably received in base portion 86 of proving ring 71. A load receiving platform as indicated by the broken line 87 may be mounted on proving ring 71. When a load P is applied to the load receiving platform, proving ring 71 deflects an amount proportional to the applied load and there is movement of chamber 72 into sealing member 74. This moves measuring interface 16 in the direction of crystal 17, thereby reducing the distance $d_m$ therebetween. Therefore, the transit time of a wave propagated through medium 77 to interface 16 and return is decreased a proportional amount.

In FIGS. 4 and 5 the distance $d_m$ between interface 16 and crystal 17 has been exaggerated for clarity of illustration.

Figure 6:
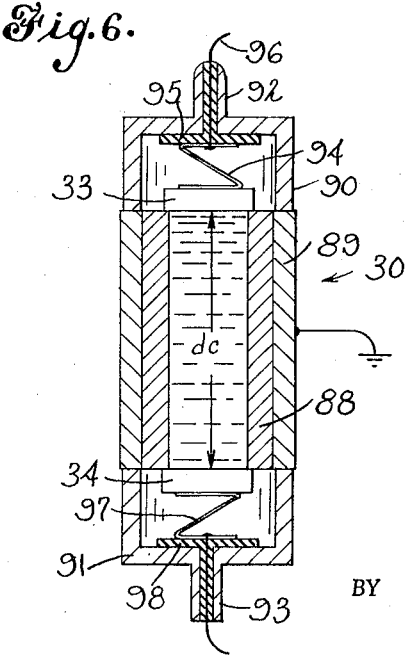
FIG. 6 is a view, in section, of a transducer used in the timing section of the system of FIG. 1.

The transducer 30 of FIG. 1 of clock system 11 is shown in detail in FIG. 6. Transducer 30 generally comprises a propagation chamber defining member 88 which determines the distance $d_c$ between crystals 33 and 34, an outer sleeve member 89 and end cap members 90 and 91. End cap members 90 and 91 may be provided with studs 92 and 93, respectively, which may be utilized for mounting purposes. Crystal 33 is hld against member 88 by means of a contact spring 94 preferably of beryllium copper. Spring 94 rests against an insulating disk 95. Spring 94 is connected to a lead-in wire 96 passing through stud 92 and insulated therefrom. Pulses from crystal matching network 29 are applied to crystal 33 through lead-in wire 96 and contact spring 94. Crystal 34 is held against member 88 by means of a contact spring 97 similar to contact spring 94. Contact spring 97 rests on insulator 98 and is connected to an insulated lead-in wire 99 extending through stud 93. When a wave propagates through the fixed distance $d_c$ from crystal 33 and strikes crystal 34, crystal 34 generates a signal at its natural frequency, which signal is applied to receiver amplifier 31 and shaped into a pulse as previously explained. Crystals 33 and 34 are selected to have the same natural frequency which is the frequency of oscillator 28. The chamber defined by member 88 is filled with the same medium 77 as found in propagation chamber 72, FIG. 5.

To further explain the operation of the system, consider a specific embodiment of the invention using a proving ring having a 4½₃₂ inside diameter. In the transducer 12, the distance between interface 16 and crystal 17 is —127 cm. Water is the propagation medium and has a velocity of propagation of $1.51 \times 10^5$ centimeters per second at 30° centigrade.

Therefore the time required for a wave to travel from crystal 17 to interface 16 and return is $1.68 \times 10^{-6}$ seconds. The proving ring was designed to deflect .101 centimeter at full load. Therefore the minimum change in transit time that has to be resolved is a as follows:

$$\Delta t' = \frac{d'}{V_{p'}}$$

where:

$d'$=maximum deflection of load cell structure
$V_{p'}$=velocity of propagation
$\Delta t'$=change in transit time for .101 cm. deflection $$\Delta t' = \frac{.101(2)}{1.51 \times 10^5} = 1.34 \times 10^{-6} \text{ sec.}$$

For one part in two thousand accuracy we have $$\frac{1.34 \times 10^{-6}}{2 \times 10^3} = .67 \times 10^{-9} \text{ sec.}$$

which is the minimum time measurement to represent one count. For this accuracy the clock system would have to furnish timing pulses at a frequency of $1.49 \times 10^9$ cycles per second. However, in accordance with the invention a much slower clock frequency may be utilized.

The time of $.67 \times 10^{-9}$ seconds represents the time measurement that would have to be made if the deflection of the load supporting member is to be made in one pulse recirculation cycle for the desired degree of accuracy. However, if the measurement should be made in two pulse recirculation cycles then the error would be cumulative and the time change would be $1.34 \times 10^{-9}$ seconds which would lower the clock frequency required. Therefore, with $m$ pulse recirculations the clock frequency can be reduced while maintaining the same resolving power. For example, if the measurement is taken in a time of 845 microseconds to complete, the error would be $(.67 \times 10^{-9})$ $(5 \times 10^2)$ or .335 microsecond. This represents a one-count change using only a 2.98 megacycle per second timing pulse frequency. It may thus be seen that the invention provides an extremely accurate and rapid load measuring system.

In this type of system an initially apparent problem is the effect of temperature on the propagation medium inasmuch as the velocity of propagation of the medium will change with temperature. The change in velocity of propagation with temperature might be compensated in several ways. One way is to build a conventional oscillator with a clock and use a temperature-frequency control that matches the known curve for the velocity of propagation change of the propagation medium with temperature. However, in the preferred embodiment of the invention the transducer 30 is provided using a propagation medium 77, the same as found in transducer 12. Therefore, when there is any change in the velocity of propagation of the medium in transducer 12 due to temperature there will be a corresponding change in the velocity of propagation of the medium in transducer 30. With this arrangement variations in temperature do not affect the accuracy of the system. In practice, the transducers 12 and 30 are arranged in close proximity so that they will be exposed to the same ambient temperature and the velocities of propagation of the medium in each transducer will always be the same.

In another embodiment of the invention shown in

Figure 8:
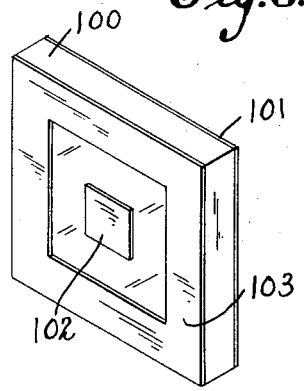
FIG. 8 is a perspective view of a piezoelectric crystal used in the transducer of FIG. 7.

FIGS. 7 and 8 the clock system transducer and the measuring system transducer are combined into a single unit with a common propagation medium. The arrangement of FIG. 7 utilizes a single crystal 100, FIG. 8, which is plated completely with silver on one side 101 thereof to form a ground plane and plated in discrete areas 102 and 103 on the opposite side thereof. The load cell shown in FIG. 7 generally comprises a transducing chamber 104 mounted in a proving ring 105. The chamber 104 is mounted on a stud 106 threadedly received into a base portion 107 of proving ring 105. Propagation chamber 104 includes means defining a crystal mounting chamber 108 which receives crystal 100 therein, an insulating spacer 109 and a plurality of contact springs 110, 111 and 112 which urge crystal 101 upwardly against spacing lips 113. In the example illustrated contact springs 110 and 112 make electrical contact with plated portion 103 and contact spring 111 makes electrical contact with plated portion 102. Slidably mounted in the upper portion of chamber 104 is depending boss portion 115 of proving ring 105 which provides a measuring interface 116. The distance between measuring interface 116 and crystal 100 is designated as $d_m$. Extending through boss 115 is a member 117 which is fixed in position and provides a fixed interface 118. Boss 115 is vertically movable with respect to fixed member 117. In this construction it may be seen that the distance $d_c$ is always constant while the distance $d_m$ will vary with the load applied to member 117. A load supporting platform as indicated by the broken lines 119 may be mounted on boss 115 of proving ring 105. Thus when a load is supplied to boss 115, the proving ring 105 will be deflected shortening the distance $d_m$. Electrical connection may be made to selected ones of contact springs 110, 111 and 112 and appropriate connections made to the measuring system 10 and clock system 11 shown in the FIG. 1. In this construction the propagation medium 120 in chamber 104 is common to both the clock and the measuring system and therefore ambient temperature variations have no effect on the accuracy of the system.

Pulses applied to the plated portions of crystal 100, specifically portions 102 and 103, effectively stress only the portion of the crystal under those plated portions and therefore the mechanical waves generated and propagated by the crystal due to a pulse from the clock system and a pulse from the measuring system are independent and have no effect upon each other.

In practice it has been found that crystals of either quartz or barium titanate, among others, are satisfactory. The quartz crystals are used at the higher frequencies because of the lower dielectric constant of the quartz, which reduces capacity effects.

It may be seen that the disclosed system measures a weight or force in terms of time, which time is dependent upon the distance between two surfaces as determined by the applied load or force. The disclosed invention provides a weighing system which is extremely accurate and gives a very precise and rapid readout. Moreover, since the output is in digital form it may very easily and accurately be applied to a data processing system which will quickly give a visual or a printed indication dependent upon the readout device utilized. The extreme sensitivity of the load system provides a system which has a wide usable range due to its sensitivity, and which is highly responsive to load variations.

It may thus be seen that the objects of the invention set forth as well as those made apparent from the preceding description are efficiently attained. For purposes of disclosure preferred embodiments of the invention have been set forth. However, other embodiments of the invention as well as modifications to the disclosed embodiments may occur to those skilled in the art which do not depart from the spirit and scope of the invention. Accordingly, it is intended to cover in the appended claims all embodiments of the invention.

What is claimed is:

1. In combination, means defining a chamber, a wave propagation medium filling said chamber, an electro-acoustic transducer in said chamber, means providing a wave reflecting surface in said chamber opposite said transducer, said surface and said transducer being movable relative to each other to vary the distance therebetween, load receiving means, said load receiving means being adapted to produce relative movement of said surface and said transducer toward each other upon application of load thereto a distance proportional to the magnitude of the load applied thereto, means for electrically exciting said transducer to transmit an acoustic wave toward said surface, whereby the wave is reflected from said surface toward said transducer, means for detecting when the reflected wave strikes the transducer and electrically excites said transducer in response thereto, and means for measuring the time required for a predetermined number of waves to be reflected from said surface to said transducer.

2. In combination, means defining a chamber, an electro-acoustic transducer in said chamber, means providing a wave reflecting surface in said chamber opposite said transducer, a wave propagating medium in said chamber extending between said transducer and said surface, said surface being movable relative to said transducer to vary the distance therebetween, means for electrically exciting said transducer to cause it to transmit an acoustic wave toward said surface, whereby the wave is reflected from said surface toward said transducer, means for detecting when the reflected wave strikes the transducer and electrically exciting said transducer in response thereto, means for generating uniformly spaced timing pulses comprising means defining a second chamber containing the same propagation medium as said first chamber, a second transducer in said second chamber, means for exciting said second transducer to propagate an acoustic wave through said medium in said second chamber, means for detecting the wave in said second chamber after a fixed distance of travel and electrically exciting said second transducer in response thereto to generate a succeeding acoustic wave in said second chamber, means responsive to each acoustic wave in said second chamber for generating a timing pulse, and means for measuring the number of timing pulses occurring in the time required to count a predetermined number of reflected waves in said first chamber.

3. In combination, means defining a chamber, an electro-acoustic transducer in said chamber, means providing a wave reflecting surface in said chamber opposite said transducer, a wave propagating medium in said chamber extending between said transducer and said surface, said surface being movable relative to said transducer to vary the distance therebetween, means for electrically exciting said transducer to cause it to transmit an acoustic wave toward said surface, whereby the wave is reflected from said surface toward said transducer, means for detecting when the reflected wave strikes the transducer and electrically exciting said transducer in response thereto, means for generating uniformly spaced timing pulses comprising a second chamber containing the same propagation medium as said first chamber, second and third transducers disposed at opposite ends of said second chamber, means for electrically exciting said second transducer to cause it to transmit an acoustic wave through the medium in said second chamber toward said third transducer, means responsive to a wave striking said third transducer for producing a timing pulse and electrically exciting said second transducer, means for counting the reflected waves in said first chamber, and means for measuring the number of timing pulses occurring in the time required to count a predetermined number of reflected waves.

4. A measuring system comprising means defining a chamber, a wave propagating medium in said chamber, an electro-acoustic transducer disposed adjacent one end of said chamber, a member providing a wave reflecting surface disposed adjacent another end of said chamber opposite said transducer, a wave propagating medium in said chamber extending between said transducer and said surface, said member being movable toward said transducer in response to an external stimulus to vary the distance between said transducer and said reflecting surface, means for electrically exciting said transducer to cause said transducer to transmit an acoustic wave toward said surface, means for detecting receipt by said transducer of a wave reflected by said surface and causing said means for exciting to excite said transducer in response thereto, whereby a recirculating pulse transmission network is established, means for generating timing pulses at a uniform repetition rate comprising means defining a second chamber containing the same propagation medium as said first chamber, a second transducer, means for exciting said second transducer to propagate an acoustic wave through said medium, means for detecting a wave after a fixed distance of travel in said second chamber, then exciting said second transducer in response thereto, means for producing a timing pulse in response to the detection of each wave in said second chamber, and means for counting the timing pulses occurring in a predetermined number of recirculation cycles.

5. A measuring system comprising means defining a chamber, a wave propagating medium in said chamber, an electro-acoustic transducer disposed adjacent one end of said chamber, a member providing a wave reflecting surface disposed adjacent another end of said chamber opposite said transducer, a wave propagating medium in said chamber extending between said transducer and said surfaces, said member being movable toward said transducer in response to an external stimulus to vary the distance between said transducer and said reflecting surface, means for electrically exciting said transducer to cause said transducer to transmit an acoustic wave toward said surface, means for detecting receipt by said transducer of a wave reflected by said surface and causing said means for exciting to excite said transducer in response thereto, whereby a recirculating pulse transmission network is established, means for generating uniformly spaced timing pulses comprising means defining a second chamber containing the same propagation medium as said first chamber, second and third transducers disposed at opposite ends of said second chamber, means for electrically exciting said second transducer to cause it to transmit an acoustic wave through the medium in said second chamber toward said third transducer, means responsive to the wave striking said third transducer for producing a timing pulse and electrically exciting said second transducer, and means for measuring the timing pulses occurring in a predetermined number of recirculation cycles.

References Cited by the Examiner
UNITED STATES PATENTS

| | | |
|---|---|---|
| 2,775,748 | 12/1956 | Rod et al. |
| 2,985,018 | 5/1961 | Williams _____ 73—398 |
| 3,008,332 | 11/1961 | Carbonnier et al. ___ 73—67.8 X |
| 3,100,885 | 8/1963 | Welkowitz et al. _____ 73—24 X |
| 3,140,612 | 7/1964 | Houghton et al. _____ 73—398 |
| 3,142,981 | 8/1964 | Gross _____ 73—133 X |
| 3,153,928 | 10/1964 | Uphoff et al. _____ 73—67.8 |

FOREIGN PATENTS

| | | |
|---|---|---|
| 1,126,419 | 7/1956 | France. |
| 144,314 | 5/1962 | Russia. |
| 149,640 | 1962 | Russia. |

OTHER REFERENCES

Cedrone et al.: "Electronic Pulse Method for Measuring the Velocity of Sound in Liquids and Solids," J.A.S.A., volume 26, No. 6 November 1954, pp. 963–966.

Forgacs: "Improvements in the Sing-Around Technique for Ultrasonic Velocity Measurements," J.A.S.A., volume 32, No. 12, December 1960, pp. 1697–1698.

RICHARD C. QUEISSER, *Primary Examiner.*

C. A. RUEHL, *Assistant Examiner.*